Patented Dec. 14, 1937

2,102,159

UNITED STATES PATENT OFFICE 2,102,159

PROCESS OF PRODUCING ACETIC ANHYDRIDE

Martin Mugdan and Johann Sixt, Munich, Germany, assignors to Consortium für Elektrochemische Industrie, G. m. b. H., Munich, Germany, a corporation of Germany No Drawing. Application November 11, 1935, Serial No. 49,253. In Germany November 13, 1934

7 Claims. (Cl. 260—123)

This invention relates to a process of producing acetic anhydride.

In the production of acetic anhydride by means of thermic splitting of acetic acid it has been found that the temperature could not be increased above about 800° C. without the formation of considerable quantities of by-products. In certain instances, particularly when catalysts were used, it was possible to employ somewhat higher temperatures and the product was found to contain a high percentage of anhydrides. This, however, was not possible without producing extensive decomposition of the acetic acid or the anhydride. The high degree of decomposition took place even if phosphates were used in solid or fused condition, which possess the property of very much accelerating the reaction. At temperatures above 800° C. carbonization took place with the formation of soot, in addition to the gaseous products of decomposition. These substances tend to fill the reaction space and cover the catalyst.

In accordance with the present invention it has been found that it was possible to obtain a good output at temperatures substantially above 800° C. by using phosphorous or phosphorus compounds, which are gaseous at the reaction temperatures, as catalysts. These substances may be added to the vapor of acetic acid in very small quantities in comparison to the acetic acid.

The invention will be better understood by referring to the following examples which are given for purposes of illustration only:

Example I

Through an empty pipe of 60 cm. length with an inside diameter of 1 cm., which was electrically heated to a length of 10 cm. to 800° C. (the temperature measurement in the interior of the pipe at the hottest point) there was passed in one hour the vapor of 630 grams of acetic acid (99.7%), which contained 2 parts per 1000 triethylphosphate. By cooling the vapors 600 grams of a 30% anhydride were condensed. At the same time an average of 24 litres of gas, generated by decomposition, was obtained hourly. The acid titre of the condensate, calculated as "acetic acid", amounted to 99.6%. The condensate was, therefore, free from by-products. From 100 mols of acetyl passed through there was accordingly obtained 35.2 mols as anhydride, 60.8 mols as acetic acid. From the average specific weight of the decomposition gas—1.1—there is figured a weight loss of 4.4% of the used acetic acid by the formation of gaseous products. In the interior of the decomposition apparatus only a small quantity of soot was found after several days of use, which covered the heated wall.

The output in anhydride can be considerably increased by adding to the vapors leaving the heat zone small quantities of nitrogen containing volatile bases, e. g. pyridine, ammonia, alkylamine. These react in such a manner as to hinder the reforming of acetic acid from anhydride or the first generated ketene in favor of the anhydride formation. The addition of these nitrogen compounds can also be effected before the putting of the acetic acid vapor into the heat zone.

Example II

The procedure was the same as in Example I. Instead of triethylphosphate there was added 2 parts per 1000 phosphorus to the acetic acid, and the mixture was evaporated. Directly behind the heat zone 2 parts per 1000 ammonia gas was allowed to flow in through a pipe connection. With an hourly passage of 630 grams of acetic acid, by maintaining a temperature of 870° C. there was obtained a condensate, the acetic acid titre of which amounted to 98.5%, and its anhydride content 50%. The waste gas amounted to 54 litres per hour, corresponding to an acetic acid loss of about 10%.

Example III

The procedure was the same as in Example I, with the difference that besides 2 parts per 1000 triethylphosphate there was added in advance 2 parts per 1000 pyridin. With an hourly passage of 630 grams of acetic acid there was obtained a condensate containing 68.3% of anhydride with an aggregate acetic acid titre of 98.4% at a temperature of 870° C. The waste gas amounted to 48 litres per hour, i. e. 8.5% of the acetic acid used.

Example IV

The procedure was the same as in Example I with the difference that 630 grams of acetic acid, containing 1 part per 1000 triethyl phosphate and 2 parts per 1000 pyridine were passed through the apparatus at 890° C. There was obtained a product with the acetic acid titre of 99.1%, containing 40.4% anhydride. There were obtained 41 litres of waste gas per hour, which correspond to 7.2% of the acetic acid.

Although certain specific examples are set forth by way of illustration, it is obvious that various changes and modifications may be made without departing from the scope of the invention, which is to be limited only in connection with the following claims when interpreted in view of the prior art.

We claim as our invention:

1. The process for producing acetic anhydride, which comprises heating acetic acid at a temperature above 800° C. in the presence of a phosphorus-containing catalyst gaseous at the reaction temperature and maintained under reaction conditions so that the catalyst is substantially all in the gaseous state.

2. The process of producing acetic anhydride which comprises heating acetic acid at a temperature above 800° C. in the presence of a small amount of a phosphorus-containing substance gaseous at the reaction temperature.

3. The process of producing acetic anhydride, which comprises heating acetic acid containing a small amount of phosphoric acid ester, to a temperature above 800° C.

4. The process of producing acetic anhydride, which comprises heating acetic acid vapor containing a small amount of a phosphorus containing substance gaseous at the reaction temperature, to a temperature above 800° C. and condensing acetic anhydride containing products from the aforementioned heating in the presence of a volatile basic nitrogen compound.

5. The process of producing acetic anhydride, which comprises heating acetic acid containing a small amount of a phosphoric acid ester to a temperature above 800° C. and condensing acetic anhydride containing products from the aforementioned heating, in the presence of a small amount of a volatile nitrogen compound.

6. A process of producing acetic anhydride, which comprises heating acetic acid vapor, containing triethyl phosphate to a temperature above 800° C. and condensing acetic anhydride containing products from the aforementioned heating, in the presence of a volatile nitrogen compound added at a point in the vapor circuit.

7. The process of producing acetic anhydride, which comprises heating acetic acid to a temperature above 800° C. in the presence of a phosphorus containing catalyst gaseous at the reaction temperature, and condensing reaction products from the aforementioned heating in the presence of a stabilizer compound from the class consisting of pyridine, ammonia and alkylamine.

MARTIN MUGDAN.
JOHANN SIXT.